(12) United States Patent
Bramson et al.

(10) Patent No.: US 7,228,022 B1
(45) Date of Patent: Jun. 5, 2007

(54) POLYMER INTEGRATED OPTICAL TRANSCEIVER

(75) Inventors: Michael D Bramson, Ridgecrest, CA (US); Paul R Ashley, Toney, AL (US); Geoffrey A Lindsay, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 170 days.

(21) Appl. No.: 11/208,119

(22) Filed: Aug. 16, 2005

(51) Int. Cl.
*G02B 6/12* (2006.01)
*G02B 6/36* (2006.01)

(52) U.S. Cl. .............................. 385/14; 385/12; 385/39; 385/88; 385/129; 385/131; 385/132; 385/141; 385/142; 385/143; 385/144; 385/145

(58) Field of Classification Search ................. 385/12, 385/14, 39, 88, 90–92, 129–132, 141–145
See application file for complete search history.

(56) References Cited

U.S. PATENT DOCUMENTS

| 5,321,503 | A | 6/1994 | Bramson |
| 5,422,713 | A | 6/1995 | Bramson |
| 2005/0224946 | A1* | 10/2005 | Dutta .......................... 257/686 |
| 2005/0232532 | A1* | 10/2005 | Wang et al. .................. 385/13 |

* cited by examiner

*Primary Examiner*—Frank G. Font
*Assistant Examiner*—Michael P. Mooney
(74) *Attorney, Agent, or Firm*—Charlene A. Haley

(57) ABSTRACT

An optical transceiver comprising an optical bench including of a waveguide on a substrate, a light source, a system of transceiver module waveguides, a waveguide coupler, a fiber, and a detector.

27 Claims, 1 Drawing Sheet

POLYMER INTEGRATED OPTICAL TRANSCEIVER

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention relates to Inertial Measurement Units (IMU) employing interferometric fiber optic gyroscopes (IFOG) and other sensors and communication systems.

BACKGROUND OF THE INVENTION

The Interferometric Fiber Optic Gyroscope (IFOG) was first developed at Stanford University in 1981. The Stanford IFOG is more fully described in the Stanford Report No. 3586, June 1983 by Ralph Alan Bergh G. L., of Stanford, Calif. The operation of this basic IFOG follows. A light source passes light through the interferometer optics and is split into two beams that propagate in opposite directions around the fiber optic coil. The light is recombined and the resultant intensity at the detector is proportional to the phase difference between the two beams. This phase difference is in turn proportional to an input rotation rate.

The Stanford IFOG research demonstrated the suitability of the IFOG as a rotation sensor for navigation applications. If mass production techniques could be devised for fabricating the sensor, electronic methods employed for error compensation as well as obtaining a linear digital output, and packaging devised for overcoming environmental sensitivities, the gyro could be made practical. Technology developed in the 1980's addressed these issues.

To make the sensor more producible, environmentally stable, and better suited to digital electronics, a Lithium Niobate ($LiNbO_3$) crystal integrated optical chip with waveguides, couplers, and phase modulators was developed. Optical waveguides are devices that guide light waves along a path typically defined by a transparent core and a transparent cladding surrounding the core, with the cladding material generally having a lower index of refraction than the core material. The chip is employed between the input fiber optic coupler and the fiber optic coil of the gyroscope. The highly degenerate mode rejecting true single mode waveguide operation (highly polarizing waveguide), high modal purity, and low polarization cross talk performance of the crystal waveguides enabled navigation application gyro performance. The high modulation bandwidth and linearity possible with the $LiNbO_3$ chip enabled the use of electronic means for error compensation and generating a linear digital output. Additionally, the component plainarization afforded by integrated optic fabrication eliminates some of the inter-component misalignments which degrade performance. Finally, using the integrated optics chip reduces the parts count, the volume, and the touch labor required to manufacture the gyroscope.

Although the $LiNbO_3$ chip provides a level of integration, the gyro remains as an assembly of discretely packaged components wherein each gyro component has attached fiber optics used to communicate with other components. Further, the redundant packaging adds bulk, cost, and electrical complication from shielding and grounding considerations.

BRIEF DESCRIPTION OF THE DRAWING

It is to be understood that the foregoing general description and the following detailed description are exemplary and explanatory only and are not to be viewed as being restrictive of the present invention, as claimed. Further advantages of this invention will be apparent after a review of the following detailed description of the disclosed embodiments, which are illustrated schematically in the accompanying drawings and in the appended claims.

DETAILED DESCRIPTION OF THE EMBODIMENTS

Figure 1:
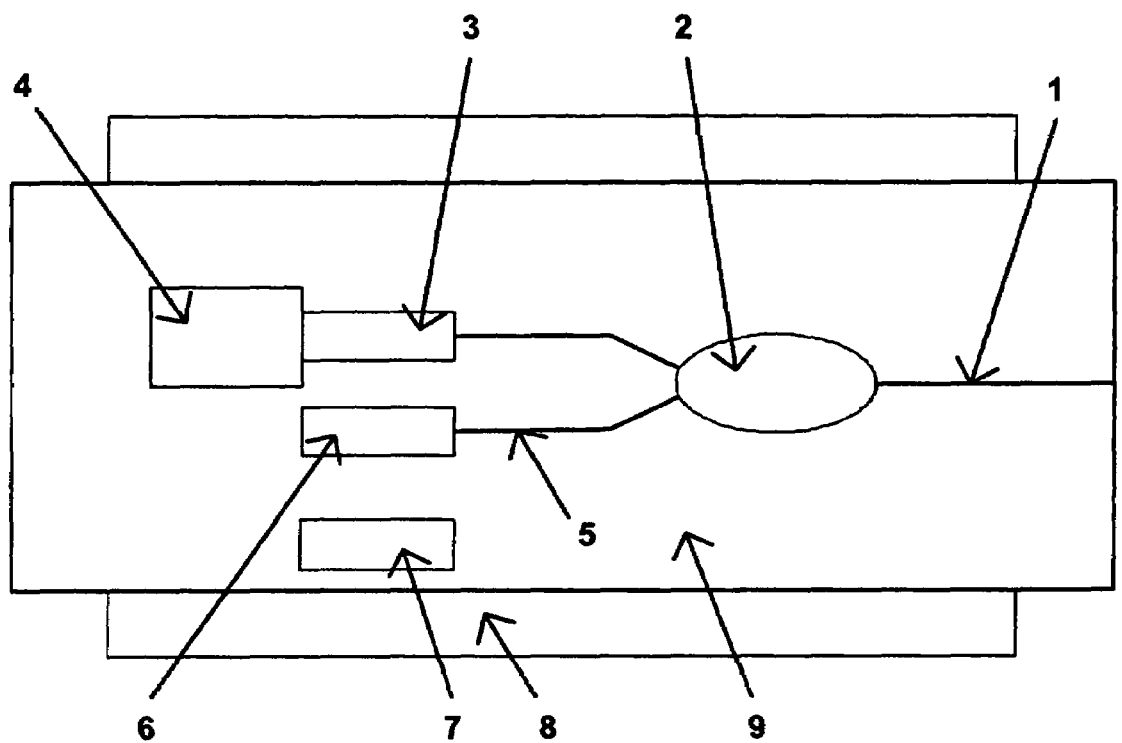
FIG. 1 shows a schematic for an integrated optical transceiver, according to embodiments of the invention.

The invention relates to an optical transceiver including an optical bench comprising of a waveguide on a substrate. The transceiver includes a light source coupled to the optical bench and a system of transceiver module waveguides that are incorporated into the top layer of the optical bench. The waveguides are patterned into the optical bench utilizing a combination of specific optical waveguide polymer layers.

The transceiver includes a waveguide coupler having at least three ports: an output port, a detector port and a light source port. The coupler is incorporated into the top layer of the optical bench and the coupler is patterned into the optical bench utilizing a combination of specific optical waveguide polymers. The output port is coupled to the waveguide coupler and a fiber. The fiber propagates an optical signal into the output port, into the waveguide coupler, through the detector port, and into a detector. The detector is coupled to the optical bench where the detector converts optical signal into electrical signal.

In other embodiments, the transceiver includes a pre-amplifier and the detector is coupled to the system of transceiver module waveguides and pre-amplifier wherein the light from the light source includes a continuous wavelength distribution. In other embodiments, the transceiver further includes a thermal management system having a thermistor and a thermoelectric cooler (TEC). The thermistor is coupled to the thermoelectric cooler and the thermoelectric cooler is coupled to the optical bench for thermal management of the transceiver. In further embodiments, the transceiver includes a thermoelectric cooler (TEC). The thermoelectric cooler is coupled to the optical bench for thermal management of the transceiver.

The light source produces light having a continuous wavelength distribution that propagates into the channel of the waveguide, into the light source port of the waveguide coupler, and into the single output port. The light propagates from the output port to the fiber, into the waveguide coupler, and into the waveguide. The optical signal propagates through the detector port and into the detector where the optical signal is converted into the electrical signal before leaving the polymer integrated optical transceiver. In other embodiments, the light source produces light having a quasi-guassian wavelength distribution that propagates into the channel of the waveguide.

The system of optical waveguides and waveguide coupler of the transceiver includes a substrate, a lower cladding, a birefringent core, and an upper cladding. The core is coupled to the upper cladding and the lower cladding. The substrate is coupled to the lower cladding. The lower cladding has a low- or non-birefringent property. The core includes an optical channel. The lower cladding, core, and upper cladding each include an ordinary index of refraction and an extraordinary index of refraction. The lower cladding includes an extraordinary index of refraction being $ne_L$ and an ordinary index of refraction being $no_L$. The core includes an extraordinary index of refraction being $ne_C$ and an ordinary index of refraction being $no_C$. The upper cladding includes an extraordinary index of refraction being $ne_U$ and an ordinary index of refraction being $no_U$. The ordinary indices of refraction (nTE) includes $no_U < no_C > no_L$ and the extraordinary indices of refraction (nTM) includes $ne_L > ne_C > ne_U$. The polarization state of the optical mode of the transceiver is transverse electric (TE) and the extinction of undesired (TM) mode is greater than 55 dB.

The waveguide on said substrate is constructed of polymer material(s) having non-birefringent solvent resistant polymers including at least one of, but not limited to, Pyrilin 2525 and similar polyimides, and Norland 61 and similar epoxy polymer resins. The substrate is constructed of material(s) including of silicon coated with a layer of silicon nitride. The lower cladding is constructed of material(s) including at least one of, but not limited to, Pyrilin 2525 and similar polyimides. The birefringent core is constructed of material(s) including at least one of, but not limited to, Pyrilin 5878 and similar polyimides. The upper cladding is constructed of material(s) including at least one of, but not limited to, Norland 61 and similar epoxy polymer resins.

The light source includes at least one of, but not limited to, super luminescent diode(s) (SLD), a laser, and fiber source (including a laser pumped Erbium doped fiber). In embodiments, the light from the light source includes a wavelength of about 1300 nm to about 1550 nm. In other embodiments the optical bench is a unitary structure. The transceiver is utilized in an interferometric sensor.

In other embodiments the thermoelectric cooler is coupled under the optical bench for thermal management of the transceiver. In embodiments, the core of the waveguide is dimensioned and configured in the shape of a rib and the waveguide includes a planar upper and lower cladding. In other embodiments, the core of the waveguide is dimensioned and configured in the shape of a trench and the waveguide includes a planar upper and lower cladding.

The fiber pigtail is positioned between and coupled to a fiber in a sensor and a waveguide coupler. The pigtail includes at least one of, but not limited to, Polarization Maintaining (PM) optical fiber, single-mode fiber, and multimode fiber. In embodiments, the waveguides are constructed to guide a transverse magnetic (TM) single optical mode by using birefringent lower cladding, a non- (or low-) birefringent core, and a (TM) light source. In other embodiments, the waveguides are constructed to guide non-polarized light using non-birefringent core and cladding materials. The waveguides are constructed for specific wavelengths including the visible to infrared ranges.

The invention further relates to the integration and means for integrating all front-end components of an IFOG into a single transceiver module with a polymer-on-silicon and beam splitter module, replacing the LiNbO3 crystal. The polymer-on-silicon waveguides permit the hybridization of the transceiver and the mass production by semi-conductor processing equipment of the transceiver.

FIG. 1 shows a schematic for an integrated optical transceiver. In embodiments, the unit is constructed of a polymer on silicon substrate 9 and includes a light source 6, a detector 3, a pre-amplifier 4, and a thermistor 7 mounted on a thermoelectric cooler (TEC) 8. The polymer on silicon substrate is termed a silicon optical bench. This designation is due to two reasons: first, the substrate is utilized as the mounting bench or optical bench for the other components to be mounted onto; and secondly, the incorporation of the optical waveguides that are patterned using a combination of different polymers includes the top layers of this bench.

In operation, a light source, including a super luminescent diode (SLD) or a fiber source (typically a laser pumped Erbium doped fiber) 6 produces light with short coherence length that is fed into one port of the waveguide coupler or Y junction 2. This type of source is what is typically used for an IFOG implementation. For other types of applications semiconductor laser sources are used. The wavelength of operation is any band or line width in the spectrum. However, a wavelength of, but not limited to about 1300 nm or about 1550 nm is desired for IFOG applications. The light from a source is coupled into the polymer waveguides 5 and propagates to the Y junction and onto the single output port 1. Signal light from the specific sensor returns back to this port and propagates to the detector element 3 where it is amplified before leaving the system.

Microfabrication technology using polymers allows the construction of the optical circuit components, i.e. the waveguides and Y branch (or power splitter) to be implemented on a single substrate. In embodiments, the substrate for this optical circuit uses the silicon wafer as a silicon optical bench or platform for all these circuit components.

After sizing the prospective discreet components, a construct is generated for the transceiver. A transceiver chip construct requires an area to mount the pre-amplifier 4, a coupler or Y branch optical waveguide 2, and other components including a SLD source 6, a detector element 3, a thermistor 7, wire bonding pads and electrical circuit traces and grounding planes (not shown). This optical circuit chip or silicon optical bench transceiver is mounted into a metal housing package. Housed underneath the optical circuit chip in the housing is a thermoelectric cooler 8. The pinout pattern for this package is a standard 14 pin dual in line pattern for the telecom industry.

The transceiver module waveguide structure includes a substrate, a lower cladding, a core, and an upper cladding. The core is coupled to the upper cladding and the lower cladding, and the core includes an optical channel(s). The substrate is coupled to the lower cladding. The lower cladding, upper cladding, and core polymer films have an ordinary index of refraction and an extraordinary index of refraction. In the TE transceiver module waveguide the lower cladding has an extraordinary index of refraction of $ne_L$ and an ordinary index of refraction of $no_L$, the core has an extraordinary index of refraction of $ne_C$ and an ordinary index of refraction of $no_C$, the upper cladding has an extraordinary index of refraction of $ne_U$, and an ordinary index of refraction of $no_U$. The core and cladding materials have the following index profile. The extraordinary indexes of refraction are $ne_L > ne_C > ne_U$, and the ordinary indexes of refraction are $no_U < no_C > no_L$. This is accomplished by using a birefringent core material with a non- (or low-) birefringent lower cladding material. This yields a polarization state of the optical mode that is transverse-electric (TE). The extinction of the unwanted (TM) mode is greater than 55 dB.

Several complex integration issues for the transceiver are considered in the construct. Integration issues include optical crosstalk, optical isolation, mechanical stability, thermal management, and electrical crosstalk. Optical crosstalk describes the unwanted background light present on the detector. This is often suppressed with absorption materials and proper placement of components to minimize the direct path for scattering. Optical isolation techniques prevent the chip optical facets from reflecting light back at favorable angles for propagating back into waveguides. This light then manifests itself as background noise and reduces the system rotation signal dynamic range. Angle cuts and angle polishes for these coupling interfaces significantly reduce this reflected light. Mechanical stability in the placement of the components is required to maintain stable coupling of the light from one component into another. A proper choice of substrate materials and thicknesses provides the best means for maintaining stability. Thermal management is a key to preventing the source from drifting in wavelength and power. Wavelength drift manifests itself as scale factor error, phase noise, and/or intensity fluctuations at the output signal detection plane. Electrical crosstalk is typically generated from outside sources and from modulator electronics that interfere with signal integrity resulting in reduced system sensitivity.

The transceiver light source of an embodiment is either a 1.3μ or 1.5μ wavelength, broad band, vertically polarized with respect to the plane of the die, multiple quantum well die with an angle stripe geometry. This type of light source exhibits: (1) high power to overcome optical losses and maintain the required signal to noise ratio (2) the near gaussian broad band spectrum required to minimize polarization dependent bias uncertainty (3) a single mode active region for optimal coupling efficiency to the single mode polymer waveguide (4) an angle geometry that spoils back-reflection, ensuring a near gaussian spectrum.

The transceiver detector preamplifier specifications are determined by the gyro performance desired. The detector die is attached to the substrate in a similar fashion as the light source. For the TM mode, the waveguide is single mode at the wavelength of operation. For the structure to guide TM and radiate TE, the TM index of the cladding must be lower than the TM index of the core, and the TE index of the cladding must be higher than the TE index of the core. The silicon substrate index of refraction is much higher than any of the polymers and will conduct the radiated light into the substrate.

Fibers in embodiments are attached to the waveguides by optical epoxy having first been mounted in a ferule. The waveguide end faces and fiber end faces are cut at a specific angle to minimize backreflection from the interface. The fibers are rotationally aligned using a white light interferometer technique. This process is described in more detail in U.S. Pat. No. 5,422,713. This application incorporates by reference U.S. Pat. No. 5,422,713, which was issued on Jun. 6, 1995. This patent provides a method for precise rotational alignment of bi-refringent waveguide. This application incorporates by reference U.S. Pat. No. 5,321,503, which was issued on Jun. 14, 1994. This patent provides a more detailed analysis regarding interferometric fiber optic gyroscope utilizing an integrated optical chip with waveguides and couplers imbedded in it.

Embodiments include polymer materials that are of amorphous type polymers vice polycrystalline type polymers. The amorphous polymers are used to avoid light scatter off the crystallites that cause detrimental optical attenuation in the waveguide and exhibit low intrinsic optical loss. The critical factor for achieving high polarization extinction and low waveguide scattering loss from wall roughness is the index profile of the core and cladding materials.

While embodiments of the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. An optical transceiver, comprising:
   an integrated optical bench comprising of a waveguide on a substrate;
   a thermal management system comprising;
      a thermistor and a thermoelectric cooler (TEC), wherein said thermistor is coupled to said thermoelectric cooler, wherein said thermoelectric cooler is coupled to said optical bench for thermal management of said transceiver;
   a light source, wherein said light source is coupled to said optical bench;
   a system of transceiver module waveguides, said waveguides are incorporated into a top layer of said optical bench, said waveguides are patterned into said optical bench utilizing a combination of specific optical waveguide layers;
   a waveguide coupler having at least three ports, a output port, a detector port and a light source port, said coupler is incorporated into said top layer of said optical bench, said coupler is patterned into said optical bench utilizing a combination of specific optical waveguide layers;
   wherein said output port is coupled to said waveguide coupler and a fiber, wherein said fiber propagates an optical signal, wherein said optical signal propagates from said fiber into said output port and optical signal is propagated into said waveguide coupler and through said detector port and into a detector;
   wherein said detector is coupled to said optical bench, wherein said detector converts optical signal into electrical signal;
   a pre-amplifier, wherein said detector is coupled to said system of transceiver module waveguides and said pre-amplifier; and
   wherein said light source produces light having a continuous wavelength distribution that propagates into said channel of said waveguide and into said light source port of said waveguide coupler and into said single output port, wherein said light propagates from said output port to said fiber, wherein said optical signal propagating from said fiber, into said output port and propagates into said waveguide coupler and into said waveguide, wherein said optical signal propagates through said detector port and into said detector, wherein said optical signal is converted into said electrical signal and into said pre-amplifier before leaving said polymer integrated optical transceiver.

2. The transceiver according to claim 1, wherein said system of optical waveguides and said waveguide coupler comprises;
   a substrate, a lower cladding, a birefringent core, and an upper cladding, wherein said core being coupled to said upper cladding and said lower cladding, wherein said substrate coupled to said lower cladding, wherein said lower cladding has a low or non birefringent property, wherein said core includes an optical channel;
   said lower cladding, said core, and said upper cladding each having an ordinary index of refraction and an extraordinary index of refraction, wherein said lower cladding having an extraordinary index of refraction being $ne_L$ and an ordinary index of refraction being $no_L$, said core having an extraordinary index of refraction being $ne_C$ and an ordinary index of refraction being $no_C$, said upper cladding having an extraordinary index of refraction being $ne_U$ and an ordinary index of refraction being $no_U$; wherein said ordinary indices of refraction (nTE) includes $no_U < no_C > no_L$ and said extraordinary indices of refraction (nTM) includes $ne_L > ne_C > ne_U$ wherein the polarization state of the optical mode of said transceiver is transverse electric (TE) and wherein the extinction of undesired (TM) mode is greater than 55 dB.

3. The transceiver according to claim 1, wherein said light source comprises at least one of super luminescent diode(s) (SLD), a laser, and fiber source (including a laser pumped Erbium doped fiber).

4. The transceiver according to claim 1, wherein said light from said light source includes a wavelength of about 1300 nm to about 1550 nm.

5. The transceiver according to claim 1, wherein said optical bench is a unitary structure.

6. The transceiver according to claim 1, wherein said thermoelectric cooler is coupled under said optical bench for thermal management of said transceiver.

7. The transceiver according to claim 1, wherein said waveguide on said substrate is constructed of polymer material(s) having non-birefringent solvent resistant polymers comprising at least one of Pyrilin 2525 and similar polyimides, and Norland 61 and similar epoxy polymer resins.

8. The transceiver according to claim 1, wherein said substrate is constructed of material(s) comprising of silicon coated with a layer of silicon nitride.

9. The transceiver according to claim 2, wherein said lower cladding is constructed of material(s) comprising at least one of Pyrilin 2525 and similar polyimides.

10. The transceiver according to claim 2, wherein said birefringent core is constructed of material(s) comprising at least one of Pyrilin 5878 and similar polyimides.

11. The transceiver according to claim 2, wherein said upper cladding is constructed of material(s) comprising at least one of Norland 61 and similar epoxy polymer resins.

12. The transceiver according to claim 2, wherein said core of said waveguide is dimensioned and configured in the shape of a rib and said waveguide having a planar upper and lower cladding.

13. The transceiver according to claim 2, wherein said core of said waveguide is dimensioned and configured in the shape of a trench and said waveguide having a planar upper and lower cladding.

14. The transceiver according to claim 1, further comprising a fiber pigtail positioned between and coupled to a fiber in a sensor and said waveguide coupler.

15. The transceiver according to claim 14, wherein said pigtail comprises at least one of polarization maintaining optical fiber or equivalent, single-mode fiber, and multimode fiber.

16. The transceiver according to claim 1, wherein said waveguides are constructed to guide a transverse magnetic (TM) single optical mode by using a birefringent lower cladding and a non- (or low-) birefringent core, and a (TM) light source.

17. The transceiver according to claim 1, wherein said waveguides are constructed to guide non-polarized light using non-birefringent core and cladding materials.

18. The transceiver according to claim 1, wherein said waveguides are constructed for specific wavelengths including the visible to infrared range.

19. The transceiver according to claim 1, wherein said transceiver is used in an interferometric sensor.

20. The transceiver according to claim 1, wherein said optical bench is constructed of silicon.

21. The transceiver according to claim 1, wherein said optical bench is constructed of materials that propagate light.

22. The transceiver according to claim 1, wherein said substrate is constructed of materials that propagate light.

23. The transceiver according to claim 1, wherein said light from said light source includes a quasi-guassian wavelength distribution.

24. An optical transceiver, comprising:
  an integrated optical bench comprising of a waveguide on a substrate;
    a light source, wherein said light source is coupled to said optical bench;
    a system of transceiver module waveguides, said waveguides are incorporated into a top layer of said optical bench, said waveguides are patterned into said optical bench utilizing a combination of specific optical waveguide layers;
    a waveguide coupler having at least three ports, a output port, a detector port and a light source port, said coupler is incorporated into said top layer of said optical bench, said coupler is patterned into said optical bench utilizing a combination of specific optical waveguide layers;
    wherein said output port is coupled to said waveguide coupler and a fiber, wherein said fiber propagates an optical signal, wherein said optical signal propagates from said fiber into said output port and optical signal is propagated into said waveguide coupler and through said detector port and into a detector;
    wherein said detector is coupled to said optical bench, wherein said detector converts optical signal into electrical signal; and
  wherein said light source produces light having a continuous wavelength distribution that propagates into said channel of said waveguide and into said light source port of said waveguide coupler and into said single output port, wherein said light propagates from said output port to said fiber, wherein said optical signal propagating from said fiber, into said output port and propagates into said waveguide coupler and into said waveguide, wherein said optical signal propagates through said detector port and into said detector, wherein said optical signal is converted into said electrical signal before leaving said polymer integrated optical transceiver.

25. The transceiver according to claim 24, further comprises a thermal management system including;
  a thermistor and a thermoelectric cooler (TEC), wherein said thermistor is coupled to said thermoelectric cooler, wherein said thermoelectric cooler is coupled to said optical bench for thermal management of said transceiver.

26. The transceiver according to claim 24, further comprising a thermoelectric cooler (TEC), wherein said thermoelectric cooler is coupled to said optical bench for thermal management of said transceiver.

27. The transceiver according to claim 24, further comprising a pre-amplifier, wherein said detector is coupled to said system of transceiver module waveguides and said pre-amplifier wherein said light from said light source includes a continuous wavelength distribution.

* * * * *